United States Patent
Wang et al.

(10) Patent No.: US 8,552,689 B2
(45) Date of Patent: Oct. 8, 2013

(54) SYSTEM AND METHOD FOR INFORMATION HANDLING SYSTEM BATTERY CHARGE PROTECTION AND FAULT ALARM

(75) Inventors: Ligong Wang, Round Rock, TX (US); Gerald Courtney, Jr., Austin, TX (US); Yin-Cheung Ma, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1379 days.

(21) Appl. No.: 11/844,407

(22) Filed: Aug. 24, 2007

(65) Prior Publication Data

US 2009/0051315 A1 Feb. 26, 2009

(51) Int. Cl.
*H01M 10/44* (2006.01)
*H01M 10/46* (2006.01)

(52) U.S. Cl.
USPC ........................................................ 320/134

(58) Field of Classification Search
USPC ................. 320/107, 112–115, 134, 163–164, 320/138
See application file for complete search history.

(56) References Cited

U.S. PATENT DOCUMENTS

| 5,896,260 | A  | * | 4/1999 | Esposito ......................... 361/79 |
| 7,023,175 | B2 |   | 4/2006 | Guang et al. .................. 320/116 |
| 7,202,631 | B2 |   | 4/2007 | Breen et al. ................... 320/132 |
| 7,391,184 | B2 | * | 6/2008 | Luo et al. ...................... 320/137 |
| 2005/0017676 | A1 | * | 1/2005 | Takimoto et al. ............. 320/107 |
| 2006/0181244 | A1 | * | 8/2006 | Luo et al. ...................... 320/128 |

* cited by examiner

*Primary Examiner* — Edward Tso
(74) *Attorney, Agent, or Firm* — Terrile, Cannatti, Chambers & Holland, LLP; Robert W. Holland

(57) ABSTRACT

An information handling system battery has first and second protective circuits to detect and address faults for a first charge applied from an external power source to an integrated charger and a second charge applied from a charger of an information handling system to battery cells. If the first protective circuit detects a fault associated with the integrated charger, charging of the battery cells is still supported by inserting the battery in an information handling system. If the second protective circuit detects a fault, the battery becomes inoperative by disconnecting the battery cells. An indicator, such as LEDs on the battery casing, indicates whether a soft or hard fault has occurred.

3 Claims, 2 Drawing Sheets

SYSTEM AND METHOD FOR INFORMATION HANDLING SYSTEM BATTERY CHARGE PROTECTION AND FAULT ALARM

BACKGROUND OF THE INVENTION

1. Field of the Invention

The present invention relates in general to the field of information handling system batteries, and more particularly to a system and method for enhanced battery charge protection and fault alarm.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have become increasingly popular with end users due to the flexibility that portable systems provide. A portable information handling system typically includes all of the components needed to process information integrated in a small and portable housing. A typical housing has a rotationally-coupled lid that rotates from a compact closed position to an open position that exposes a keyboard and display. The housing supports processing components to process information, such as a processor and memory, which often includes wireless networking components so the end user can communicate with networks independent of a wired connections. In order to support operation of the processing components independent of a fixed power outlet, portable information handling systems typically include an integrated battery. An external adapter converts alternating current (AC) power from a power outlet to direct current (DC) power that is transmitted to the information handling system. Usually, the DC power enters at a plug exposed at the outer surface of the housing and feeds to a charger disposed within the housing. The DC power is used to power the processing components with excess power applied to charge the battery. When the plug is disconnected from the housing, the battery discharges to power the processing components.

One disadvantage with a conventional portable information handling system battery power architecture is that the battery must be inserted into the information handling system to charge. However, in some instances, information handling system batteries are built with a charger integrated in the battery casing so that DC power from an external adapter enters directly into the battery to allow charging of the battery independent of the information handling system. An independently chargeable battery provides greater flexibility for an end user to charge the battery without the information handling system. A battery that provides a direct plug in to charge independent of an information handling system generally must have a protection circuitry connected to the battery cells to prevent catastrophic battery failure in the event of a fault. Battery protection circuitry integrated in the battery casing typically includes a charge field effect transistor (C-FET) and a discharge FET (D-FET) that automatically disconnect the battery cells from the charger when a fault is detected. When the cells are charged, AC adapter output regulated by the charger is applied to the protection circuit and cells so that the C-FET is the only protection against excessive DC voltage being applied to the battery cells.

SUMMARY OF THE INVENTION

Therefore a need has arisen for a system and method which improves information handling system battery protection during charge.

In accordance with the present invention, a system and method are provided which substantially reduce the disadvantages and problems associated with previous methods and systems for charging an information handling system battery. The battery accepts a charge through first connector the provides external power to a charger integrated in the battery and having a first protection circuit or through a second connector that provides power from a charger of a device external to the battery. Power from either the first or second connector is monitored by a second protection circuit associated with battery cells of the battery.

More specifically, an information handling system has plural processing components integrated in a housing that cooperate to process information. The processing components are powered by an external AC adapter that converts AC power to DC power with extra power provided to a charger of the information handling system. The information handling system charger provides the extra power through an internal connector to a battery inserted in a cavity of the housing to charge the battery. When the battery is removed from the cavity, an external power source connector in the battery casing connects to the AC adapter to accept DC power directly to the battery. A charger integrated in the battery casing regulates power received directly from the AC adapter to ensure safe charging of the battery. A first protection circuit associated with the charger monitors operation of the integrated charger to detect faults so that the charger is removed from charging if a fault is detected. A second protection circuit associated with battery cells within the battery detects faults associated with the battery cells and removes the battery cells from the charging circuit if a fault is detected. A fault indicator provides a soft fault indication if the charger protection circuit detects a fault and a hard fault indication if the battery cell protection circuit detects a fault.

The present invention provides a number of important technical advantages. One example of an important technical advantage is that a second level of protection at the battery allows a "soft" failure from which the battery recovers when the fault is removed. For example, a soft failure that results from the charger or embedded controller integrated with the battery will prevent direct charging of the battery from an AC adapter but allow indirect charging of the battery by inserting the battery in an information handling system. LED indicators visible at the battery casing indicate soft versus hard battery failure so that an end user will know whether the battery will accept a direct charge, an indirect charge or no charge at all.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An enhanced battery fault detection and alarm monitors an integrated charger of the battery in addition to battery cells to differentiate a hard battery failure from a soft failure in which the battery remains chargeable by an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
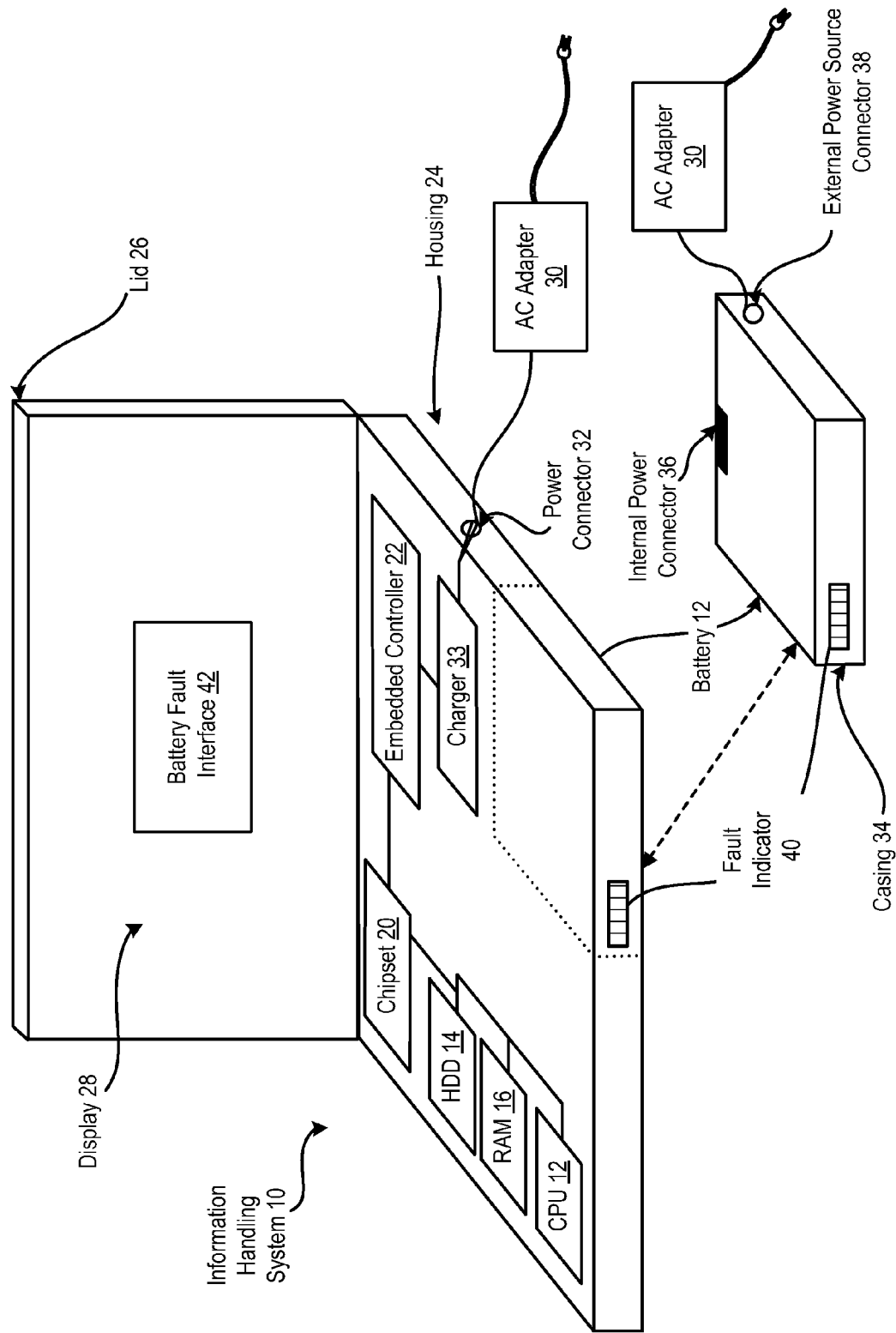
FIG. 1 depicts a block diagram of an information handling system having a battery with installed and separate charging capability.

Referring now to FIG. 1, a block diagram depicts an information handling system 10 having a battery 12 with installed and separate charging capability. Information handling system 10 has plural processing components that cooperate to process information, such as a CPU 14, RAM 16, a hard drive disk 18, a chipset 20 and an embedded controller 22. The processing components are disposed in a portable housing 24 having a rotationally coupled lid 26 that contains a display 28 for presenting processed information as visual images. Information handling system 10 is powered by an external AC adapter 30 that converts external AC voltage to DC voltage and provides the DC voltage at a power connector 32. A charger 33 within information handling system 10 charges battery 12 with power from adapter 30 that is in excess of that needed to run the processing components. If adapter 30 is disconnected from information handling system 10, battery 12 discharges to provide power to run the processing components.

Battery 12 is built in a casing 34 sized to fit in a cavity formed in housing 24 of information handling system 10. When casing 34 is properly aligned and inserted into the cavity, an internal power connector 36 disposed at the outer surface of casing 34 couples with a connector of information handling system 10 to interface charger 33 with battery 12. Internal power connector 36 accepts a charge that is regulated by charger 33 so that battery 12 reaches a fully charged state without damage. When casing 34 is removed from the cavity of information handling system 10, an external power source connector 38 is exposed that accepts power from AC adapter 30. A charger integrated in casing 34 regulates the power provided from adapter 30 to ensure that a proper charge is applied to battery 12.

The integrated charger within battery 12 has an associated protection circuit that monitors for faults associated with the charger circuit. If a fault is detected, the charger circuit is disconnected from the battery cells to prevent charging by adapter 30 through external power source connector 38 and a "soft" failure indication is provided from a fault indicator 40, such as one or more LEDs disposed in casing 34. A soft failure indicates that charging of the battery remains possible by a reset of the charger protection circuit or by inserting battery 12 into information handling system 10. Charging by charger 33 of information handling system 10 is monitored by a protection circuit associated with battery cells within battery 12. If a fault is detected by a protection circuit associated with the battery cells, a "hard" failure indication is provided by fault indicators 40 indicating that battery 12 has permanently failed. A hard failure may result from chagrining through either internal power connector 36 or external power connector 38 since a hard failure is associated with a fault of the battery cells. A soft failure occurs during charging through external power source connector 38 and indicates a failure with charging circuitry integrated in battery 12 so that charging remains possible by charger 34 of information handling system 10. In one embodiment, a battery fault interface 42 presented at display 28 receives fault indications from battery 12 to indicate soft or hard failure of a battery 12 through information handling system 10.

Figure 2:
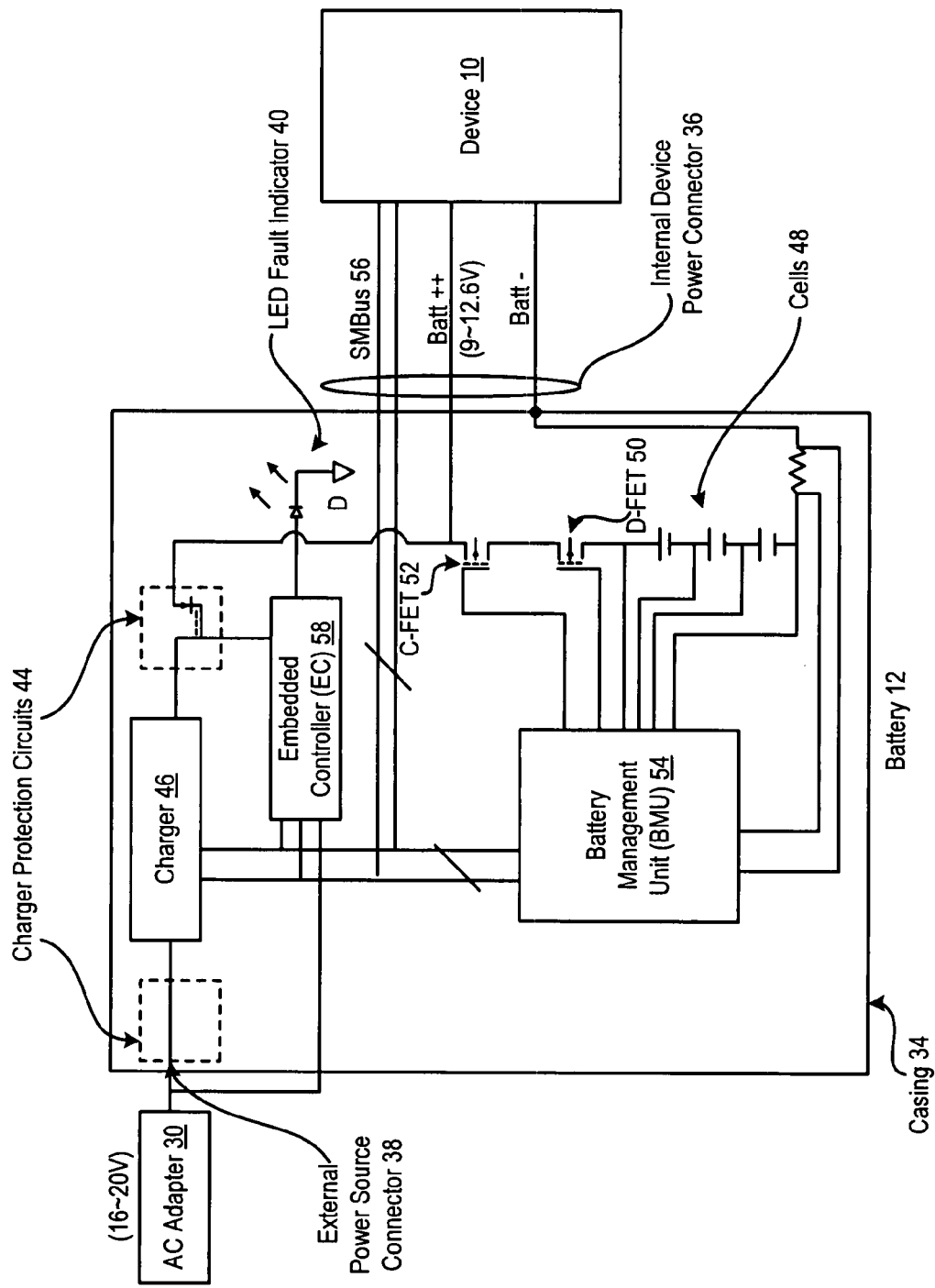
FIG. 2 depicts a circuit diagram of a battery having protective circuits associated with an integrated charger and internal battery cells.

Referring now to FIG. 2, a circuit diagram depicts a battery 12 having protective circuits 44 associated with an integrated charger 46 and protective circuits 50 and 52 associated with internal battery cells 48. Protective circuit 52 is a charge field effect transistor (C-FET) that switches off power to battery cells 48 if a fault exists in the charge provided to cells 48. Protective circuit 50 is a discharge field effect transistor (D-FET) that switches off battery cells 48 from discharging to connector 36 if a fault is detected with the discharge. A battery management unit (BMU) 54 monitors the state of battery cells 48, much as a fuel gauge, and communicates the state of cells 48 through a management bus 56 interfaced through connector 36 with the powered device 10, such as an information handling system. A hard failure of battery 12 occurs if either C-FET 52 or D-FET 50 detects a malfunction with battery cells 48 are permanently disconnected from internal device power connector 36 and adapter 38. Thus, in the event of a hard failure, battery 12 cannot accept a charge for cells 48 from either internal device power connector 36 or external power source connector 38.

In addition to charge protection provided by C-FET 52, battery 12 has a second protection circuit 44 associated with charger 46 that detects, protects against and provides an alarm for faults associated with charging through external power source connector 38. For example, a field effect transistor (FET) placed between adapter 30 and integrated charger 46 switches off in the event of a fault to prevent application of power to charger 46. As another example, a FET placed after charger 46 switches off in the event of a fault to prevent application of power from charger 46 to cells 48. While only one FET 44 will provide protection against faults associated with charger 46, both FETs may be included if desired. Charger protection circuits 44 induce a soft failure of battery 12 since a fault detected by protection circuits 44 prevent charging through external power source connector 38 but do not prevent charging through internal device power connector 36. In addition, charger protection circuits 44 induce a soft fault since circuits 44 reset once the fault is removed. An embedded controller 58, which operates independently of BMU 54, interfaces through management bus 56 with integrated charger 46 and BMU 54 to monitor battery operations and detect a fault that induces protection circuits 44, 50 and 52 to switch off. Embedded controller 58 provides intelligence with the battery for managing a charge when the battery is not inserted in the information handling system. If protective circuit 44 switches off power at charger 46, embedded controller illuminates LED fault indicators 40 to indicate a soft fault. If protective circuits 52 or 50 switches off cells 48, then embedded controller 58 illuminates LED fault indicators 40 to indicate a hard failure.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   processing components disposed in the housing and operable to process information;
   a battery coupled to the housing, the battery having an integrated charger, one or more cells, a first integrated protection circuit associated with the integrated charger and a second integrated protection circuit associated with the battery cells; and
   a charger associated with the processing components and operable to charge the battery cells if the first protection circuit has tripped.

2. A method for charging a battery, the method comprising:
   accepting DC voltage at a charger integrated in the battery;
   applying the DC voltage with the charger to charge cells integrated in the battery;
   monitoring the charger with a first protection circuit integrated in the battery;
   monitoring the cells with a second protection circuit integrated in the battery;
   detecting a fault with the first protection circuit;
   in response to detecting the fault, ceasing the applying the DC voltage with the charger; and
   applying DC voltage with a charger external to the battery through the second protection circuit.

3. The method of claim 2 wherein the charger external to the battery comprises a charger integrated in an information handling system.

* * * * *